Dec. 3, 1946.  G. E. McVEY  2,411,931
TORQUE GAUGE
Filed Jan. 11, 1944  2 Sheets-Sheet 1

Inventor
Gerald E. McVey,
By W. D. McDowell,
Attorney

Dec. 3, 1946.

TORQUE GAUGE

Filed Jan. 11, 1944

Inventor

Gerald E. McVey,

Patented Dec. 3, 1946

2,411,931

UNITED STATES PATENT OFFICE 2,411,931

TORQUE GAUGE

Gerald E. McVey, Columbus, Ohio

Application January 11, 1944, Serial No. 517,849

6 Claims. (Cl. 73—1)

This invention relates to an improved torque-testing gauge, and has for its main object to provide a simple and efficient instrumentality for indicating the power applied to a rotatable element to effect its rotation under load conditions.

In its more specific aspects, my invention is concerned with an improved instrumentality for testing torque wrenches of the slip or break-joint-handle type. As is well understood, such wrenches are constructed so that when a predetermined excess degree of torque effort is applied thereto, as in the tightening of cylinder head nuts, the spring or friction-actuated joints used in uniting the nut-engaging jaws of such wrenches with associated handle bodies will open, thereby indicating that the nuts, or other threaded bodies, acted upon have been tightened to the limits afforded through the use of such wrenches. For illustration, in the tightening of the nuts or bolts employed in clamping the cylinder heads of internal combustion engines against gaskets positioned on the upper surfaces of associated cylinder blocks, it is highly desirable that each of the threaded clamping devices exercise as nearly as possible the same clamping action or effort on such cylinder heads as the other or remaining devices, whereby to prevent creation in such cylinder heads of localized strains or stresses, which often produce fracture thereof.

While the break or slip types of torque wrenches are highly useful in this and other analogous capacities, it frequently happens that such wrenches through wear, improper adjustment, or other cause will not slip or open at exactly the pressures at which they are set or supposed to open. It is, therefore, one of the more specific objects of the present invention to provide an instrumentality through the use of which wrenches of the type indicated may be individually tested in an expeditious and convenient manner to determine their slipping or opening response to known forces or pressures, whereby each wrench may be adjusted or calibrated to operate uniformly and impart equivalent results in use.

For a further understanding of the invention, reference is to be had to the following description and the accompanying drawings, wherein.

Figure 1:
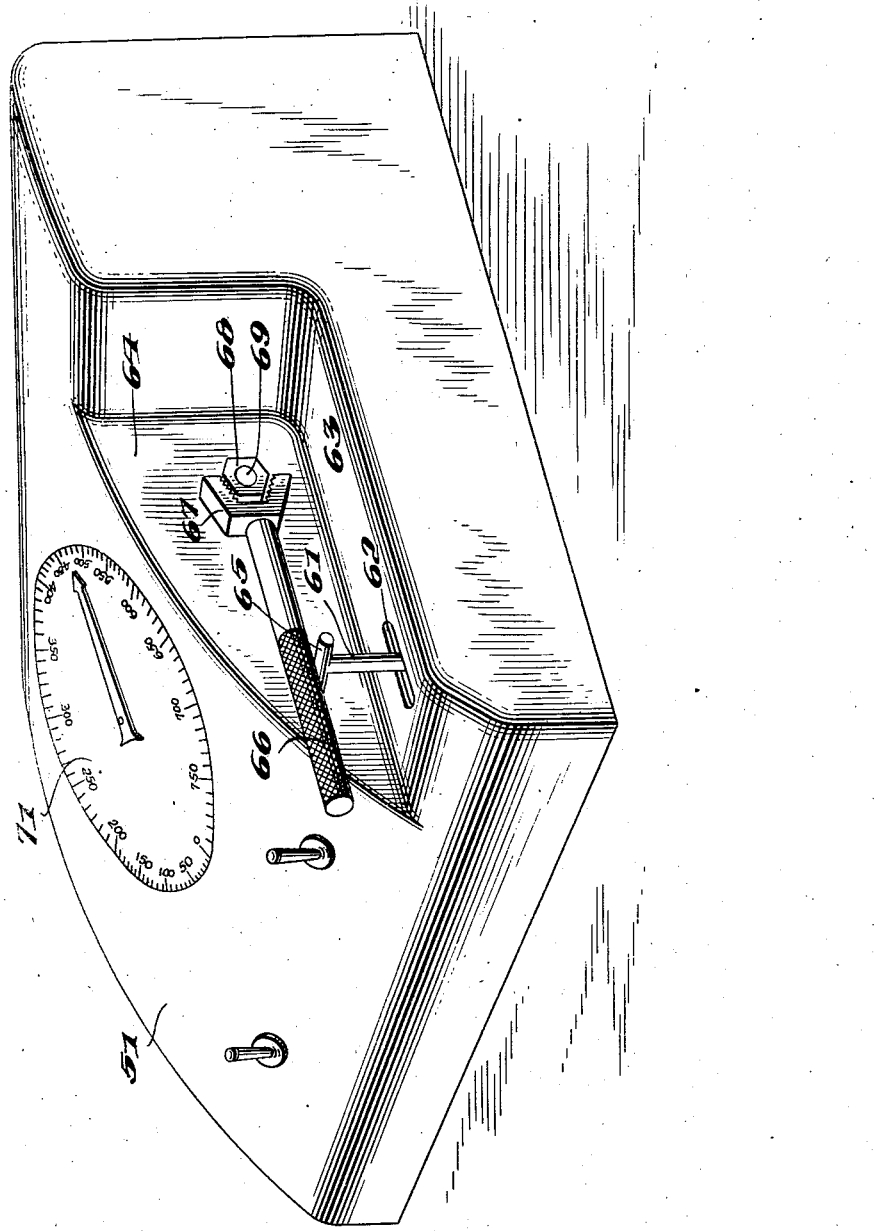
Fig. 1 is a perspective view disclosing my improved torque gauge.
Figure 3:
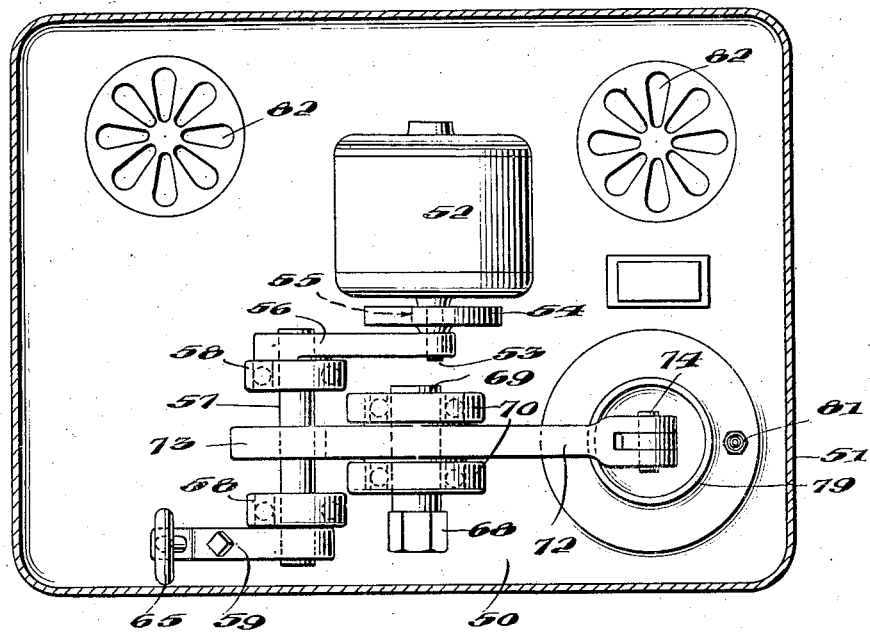
Fig. 3 is a horizontal sectional view taken on the plane indicated by the line III—III of Fig. 2.
Figure 2:
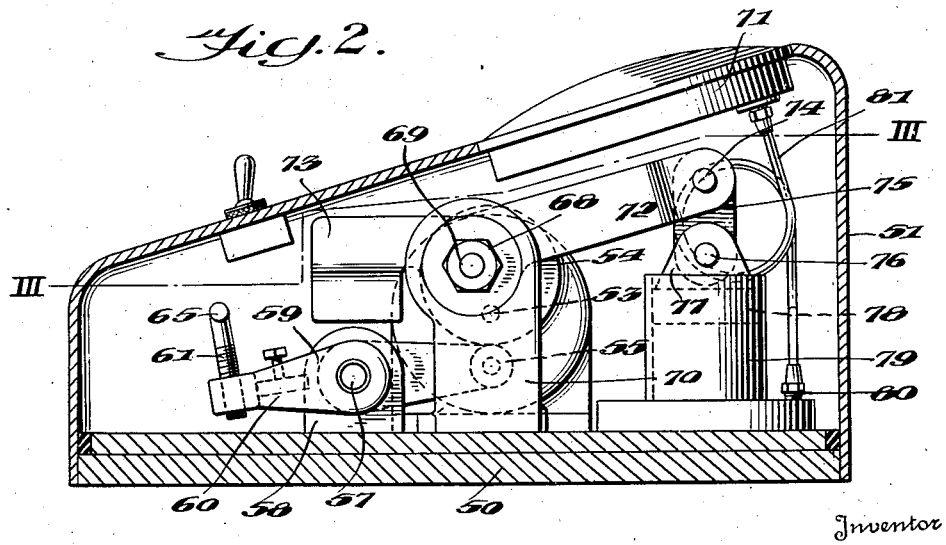
Fig. 2 is a vertical sectional view taken through the gauge.

My improved gauge comprises a base 50 upon which is mounted a casing 51. Supported upon the base within the casing is an electric motor 52 having slow speed driven shaft 53, which may be geared to turn at the rate of approximately one revolution per minute. The shaft 53 has fixed thereto an eccentric 54, which engages with a roller 55 carried by a crank arm 56. This crank arm is connected with a rock shaft 57, supported in bearings 58 arising from the base 50. Also fixed to rock in unison with the shaft 57 is a second crank arm 59 having an adjustable outer extension 60. The outer end of the extension 60 carries a fixed upwardly extending rod 61, the latter projecting through an elongated slot 62 provided in the bottom wall 63 of a recess 64, the latter being formed in one side of the casing 51. The upper end of the rod 61 carries a horizontal bar 65, which is adapted to engage the under side of the handle of a break-type torque wrench 66.

The socketed end 67 of this wrench is adapted to be removably positioned upon a replaceable nut 68 carried by one end of a stud shaft 69, the latter being journaled in brackets 70, carried by the base 50 and arranged within the casing 51. Consideration will disclose that when the motor is energized, the rotation of the eccentric 54 will rock the shaft 57, thereby elevating the crank arm 59 and causing the bar 65 at the upper end of the rod 61 to press upwardly on the handle of the wrench 66. The rotation of the stud shaft 69 is resisted, and as in the previously described form of my invention, this resistance is used to operate a pressure gauge 71, the dial face of the latter being disposed at the top of the casing.

The stud shaft 69 carries a lever arm 72 which, in this instance, is of a fixed length, rather than possessing a variable effective length. One end of the arm 72 is counter-weighted as at 73, while the opposite end thereof is pivotally connected, as at 74, to the upper end of a link 75. The lower end of this link is pivoted as at 76 to the spaced ears 77 of a slidable fluid-displacing piston 78. This piston is slidably mounted in a stationary cylinder 79, which arises vertically from the base 50. Below the solid lower end of the piston, the cylinder contains a low freezing liquid which is displaceable, upon descent of the piston, through an outlet 80, this outlet being connected by a pipe line 81 with the pressure gauge 71.

In the operation of my invention, the wrench 66 is applied to the replaceable nut 68 disposed on the outer end of the stud shaft 69, with the handle of the wrench in contact with the cross bar 65 of the rod 61. The motor 52 is then energized, causing the rotation of the cam or eccentric 54 which moves the rod 61 upwardly, applying turning effort to the wrench. This turning effort is continued, causing rotation of the stud shaft 69 and downward movement of the piston 78 in the cylinder 79. This resistance is increasingly effective as the liquid pressure is applied to the diaphragm or other yieldable element, not shown, of the pressure gauge until the joint of the handle breaks or opens, at which time the position of the indicator hand on the dial of the gauge is noted and the force required to break or open the handle of the wrench is read in inch pounds. If desired, the interior of the casing 51 may be provided with thermostatically controlled electric heaters 82, so that a uniform temperature may be maintained within the casing to render the operation of the instrument uniform irrespective of variations in temperature extraneous of the casing. The adjustment of the outer extension 60 of the crank arm adapts the bar 65 to wrench handles of varying length.

While I have described my improved gauge as being particularly applicable to the testing of torque wrenches, nevertheless, it will be understood that the gauge is applicable to the testing of torque forces generally, and while its adaptation to the testing of torque wrenches sets forth its fundamental operating principles, I reserve the right to employ my improved gauge in any capacity in which it may find practical usage, such as the testing of motor torque, the deflection of springs and in many other capacities. Therefore, the invention is subject to certain modifications and adaptations falling within the scope of the following claims.

I claim:

1. Torque-testing apparatus comprising a base, a bearing member on said base, a turnable element supported by said bearing member, one end of said element being formed for the reception of a torque wrench, a lever arm movable in unison with said element, fluid-displacing means having an operating member actuated by movement of said turnable element and lever arm, a pressure-indicating gauge operated by said fluid-displacing means, and motor-driven means for applying a rotative force to a torque wrench engaged with said turnable element.

2. Apparatus for testing torque wrenches comprising a base, a shaft rotatably supported by said base, one end of said shaft being formed to receive a torque wrench, motor actuated means carried by said base engageable with the handle of a torque wrench positioned on said shaft to apply a rotative force to said wrench and shaft, hydraulic means for applying an increasing resistance to the rotation of said shaft as the same is rotated from an initial position, and a pressure gauge actuated by said hydraulic means.

3. Force-measuring apparatus comprising a base, a bearing on said base, a turnable element supported by said bearing member, one end of said element being formed for the removable reception of an instrumentality undergoing measurement, a lever arm movable in unison with said element, fluid-displacing means connected with said lever arm, a pressure-indicating gauge operated by said fluid-displacing means, and motor actuated means for applying a rotative force to the instrumentality engaged with said turnable element.

4. Apparatus for testing torque wrenches, comprising a base, a wrench-receiving shaft journaled on said base, said shaft having a polygonal head formed for the removable reception of the jaws of a torque wrench, a motor on said base, an oscillatory arm supported on said base in spaced relation from said shaft and adapted for engagement with the handle of a wrench positioned on the head of said shaft, motion imparting means driven by said motor for oscillating said arm and thereby rocking said shaft when a torque wrench is positioned thereon, a pressure gauge, and fluid-displacing means actuated by rocking movement of said shaft for operating said gauge.

5. Apparatus for testing torque wrenches as set forth in claim 4, and wherein the oscillatory power-applying arm is provided with an adjustable wrench-handle engaging rest.

6. Apparatus for testing torque wrenches, comprising a base, a wrench-receiving shaft journaled on said base, an oscillatory power-applying arm supported on said base in spaced relation from said shaft, said arm being adapted for engagement with the handle of a wrench drivingly engaged with said shaft, a motor, eccentric means driven by said motor for oscillating said arm and thereby rocking said shaft when a wrench is engaged therewith, a counter-weighted lever arm fixed on said shaft, a pressure gauge, and fluid-displacing means actuated by turning movement of said shaft and lever arm for operating said gauge.

GERALD E. McVEY.